United States Patent
Nakamura et al.

(10) Patent No.: US 7,106,681 B1
(45) Date of Patent: Sep. 12, 2006

(54) OPTICAL HEAD ARRANGEMENTS WITH SINGLE SUBSTRATE LASERS

(75) Inventors: Shigeru Nakamura, Tachikawa (JP); Takeshi Shimano, Tokorozawa (JP); Kazuo Shigematsu, Yoshikawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/517,594

(22) Filed: Mar. 3, 2000

(30) Foreign Application Priority Data

Oct. 25, 1999 (JP) .................................. 11-301966

(51) Int. Cl.
*G11B 7/135* (2006.01)
*G11B 7/00* (2006.01)

(52) U.S. Cl. .............................. 369/112.04; 369/112.22; 369/122; 369/123

(58) Field of Classification Search ........... 369/112.29, 369/112.04, 112.22, 122, 123; G11B 7/135
See application file for complete search history.

(56) References Cited

U.S. PATENT DOCUMENTS

| | | | | |
|---|---|---|---|---|
| 4,520,472 A | * | 5/1985 | Reno | 369/112.29 |
| 4,945,529 A | | 7/1990 | Ono et al. | 369/109 |
| 5,018,127 A | * | 5/1991 | Ando | 369/112.09 |
| 5,144,614 A | * | 9/1992 | Kume et al. | 369/112.19 |
| 5,289,313 A | * | 2/1994 | Matsuoka | 359/496 |
| 5,313,441 A | * | 5/1994 | Imai et al. | 369/44.14 |
| 5,446,719 A | * | 8/1995 | Yoshida et al. | 369/116 |
| 5,513,164 A | * | 4/1996 | Tanaka et al. | 369/53.2 |
| 5,515,354 A | * | 5/1996 | Miyake et al. | 369/112.29 |
| 5,546,373 A | * | 8/1996 | Koyama | 369/120 |
| 5,555,539 A | * | 9/1996 | Kamisada et al. | 720/672 |
| 5,568,463 A | * | 10/1996 | Sahara et al. | 369/112.19 |
| 5,579,291 A | * | 11/1996 | Matsumoto | 369/13.32 |
| 5,644,413 A | * | 7/1997 | Komma et al. | 359/19 |
| 5,646,778 A | * | 7/1997 | Shuman | 359/495 |
| 5,687,152 A | | 11/1997 | Takeda et al. | 369/103 |
| 5,715,227 A | * | 2/1998 | Matsumoto | 369/112.29 |
| 5,737,296 A | | 4/1998 | Komma et al. | 369/103 |
| 5,761,177 A | * | 6/1998 | Muneyoshi et al. | 369/112.04 |
| 5,870,370 A | * | 2/1999 | Takahashi et al. | 369/112.29 |
| 5,872,760 A | * | 2/1999 | Kim et al. | 369/112.29 |
| 5,986,996 A | * | 11/1999 | Kitamura et al. | 369/112.16 |
| 5,999,509 A | * | 12/1999 | Sugiura et al. | 369/112 |
| 6,038,204 A | * | 3/2000 | Yang et al. | 369/121 |
| 6,043,935 A | * | 3/2000 | Lee | 359/566 |
| 6,081,496 A | * | 6/2000 | Otsubo et al. | 369/112.26 |
| 6,084,843 A | * | 7/2000 | Abe et al. | 369/112.29 |

(Continued)

FOREIGN PATENT DOCUMENTS

JP   10-261241   9/1998

(Continued)

OTHER PUBLICATIONS

Anisotropic—definition as found at www.photonics.com/dictionary/lookup—attached page from the noted site on Jun. 28, 2005.*

*Primary Examiner*—A M Psitos
(74) *Attorney, Agent, or Firm*—Antonelli, Terry, Stout and Kraus, LLP

(57) ABSTRACT

An optical head with a plurality of semi-conductor laser chips for use in reducing inclination or gradient of more than one beam presently falling onto a focusing lens is disclosed. To this end, a double mirror or alternatively beam reshaping means is disposed which has different reflection planes for permitting reflection of a plurality of laser beams incoming from the semiconductor laser chips.

38 Claims, 8 Drawing Sheets

U.S. PATENT DOCUMENTS

| | | | |
|---|---|---|---|
| 6,118,752 A * | 9/2000 | Miyagawa et al. | 369/275.3 |
| 6,201,228 B1 * | 3/2001 | Yoshida | 250/201.5 |
| 6,211,511 B1 * | 4/2001 | Shih et al. | 250/214 R |
| 6,257,772 B1 * | 7/2001 | Naknishi et al. | 385/89 |
| 6,278,681 B1 * | 8/2001 | Nagano | 369/112.16 |
| 6,298,028 B1 * | 10/2001 | Arikawa et al. | 369/112.22 |
| 6,304,542 B1 * | 10/2001 | Dang et al. | 369/112.23 |
| 6,324,150 B1 * | 11/2001 | Ju | 369/112.19 |
| 6,353,587 B1 * | 3/2002 | Hong et al. | 369/112.15 |
| 6,377,520 B1 | 4/2002 | Freeman et al. | 369/44.23 |
| 6,385,355 B1 * | 5/2002 | Nashimoto et al. | 385/5 |
| 6,396,791 B1 * | 5/2002 | Wakao et al. | 369/112.19 |
| 6,407,974 B1 * | 6/2002 | Kim et al. | 369/112.19 |
| 6,434,105 B1 * | 8/2002 | Kobayashi | 369/112.28 |
| 6,614,825 B1 | 9/2003 | Hang et al. | 372/50 |
| 6,646,975 B1 | 11/2003 | Uchizaki et al. | 369/121 |
| 6,778,486 B1 | 8/2004 | Arikawa et al. | 369/112.29 |

FOREIGN PATENT DOCUMENTS

| | | |
|---|---|---|
| JP | A-10-289468 | 9/1998 |
| JP | 10-283652 | 10/1998 |
| JP | A-10-261240 | 10/1998 |
| JP | 10-302291 | 11/1998 |
| JP | 11-110786 | 4/1999 |

* cited by examiner

OPTICAL HEAD ARRANGEMENTS WITH SINGLE SUBSTRATE LASERS

BACKGROUND OF THE INVENTION

1. Field of the Invention

The present invention relates generally to optical head structures for use in recording or retrieving information on or from optical information storage media including but not limited to optical disks, and more particularly to an optical head employing a laser module with a plurality of built-in semiconductor laser chips. This invention also relates to optical information media recording/reproduction apparatus using such optical head.

2. Description of Related Art

In recent years, as optical media storage devices—such as optical information recording and reproduction apparatus including optical disk drives—are becoming important more and more in the manufacture of electronic equipment, the trend has been toward optical read/write devices exhibiting smaller size and reduced thickness along with a variety of functionalities.

For example, it has been required that a single small-size optical head assembly be used to record and/or play back information to/from optical disks of different types. These include recordable compact discs, also known as compact disc-recordable or "CD-R" (trade name), and digital versatile disks (DVDs)—previously digital video disks under the same abbreviation. The former is recordable and non-erasable optical storage media as popularized in the market whereas the latter is ultrahigh-density writable optical storage media as recently developed, with two layers on each side of a disk to store video and other data. Whereas laser beams adaptable for use in recording/retrieving data to/from CD-R media measure approximately 780 nanometers (nm) in wavelength, those for DVD record/playback are about 660 nm in wavelength. In view of such laser wavelength difference, CD-R/DVD compatible record/playback apparatus should be required to come with separate or independent laser light source units—that is, both a laser light source of about 780-nm wavelength and a 660-nm laser light source—situated within a single optical head assembly. Prior known multiple light-source small-size optical heads are disclosed in, for example, JP-A-10-261240 and JP-A-10-289468. The optical heads as taught thereby are designed so that a 780-nm wavelength semiconductor laser chip for CDs and a 660-nm semiconductor laser chip for DVDs are integrally accommodated in one unit, along with more than one optical detection element operatively associated therewith.

Generally, light beams of different light emission positions tend to pass through different locations of a lens system at different angles; obviously, in the above-noted optical heads also, laser beams emitted from two semiconductor laser chips behave to reach different positions of a focusing lens at different angles. With the prior art optical heads as taught by the above-identified Japanese publications, in order to attain an increased storage density of data on optical media during recording and reproduction, the 660-nm wavelength semiconductor laser chip for DVDs is disposed at a specified location on the optical axis of a lens system consisting essentially of a focusing lens and collimating lens while letting the 780-nm wavelength semiconductor laser chip for CDs be laid out at a selected location outside of the optical axis of such lens system. This multi-laser layout would result in that while a laser beam for use in DVD recording/playback may straightly progress to hit the focusing lens at right angles thereto so that any appreciable aberration will hardly take place at a laser spot focused on the surface of a DVD, a laser spot on a CD can experience unwanted aberration (in particular, coma aberration) because of the fact that a laser beam for CD record/playback attempts to diagonally falls onto the focusing lens at an angle thereto.

To avoid this problem, the optical head disclosed in JP-A-10-261240 is designed so that a holographic optical device (designated by reference numeral "25" in the disclosure thereof) is employed to bend or curve only the optical path of a CD-read/write laser beam thereby letting it reach the focusing lens at right angles thereto. Similar beam path correction is done in the optical head of JP-A-10-289468, by alternative use of an optical composer (denoted by numeral 30 therein) including a polarizing prism (birefringent plate) or holographic device.

Unfortunately, the prior art approaches are encountered with a problem which follows. The intended laser beam path adjustability does not come without requiring use of "special" holographic devices or polarizing prisms (birefringent plates) that offer expected functionality of bending only the optical path of a 780-nm CD read/write laser beam while permitting a 660-nm wavelength DVD read/write beam to be kept free from any influence therefrom. Use of such special optical components disadvantageously results in an increase in production costs of optical head units.

Another problem faced with the prior art lies in the lack of sufficient capability to achieve light weight and slim size of optical head structures, thus failing to fully meet demands for thickness-reduction or down-sizing of optical heads. More specifically, although not specifically set forth in the above-identified Japanese documents, it will readily occur to those skilled in the art that those optical components other than the focusing lens must be laid out in a plane parallel to the disk surface while at the same time requiring use of an additional mirror, called a "riseup" mirror, in order to guide beams to accurately hit the focusing lens. Moreover, in order to attain the intended recording of information on a target disk, a beam reshaping prism should also be required for efficient collection or focusing of rays of light emitted from a semiconductor laser with anisotropic optical intensity distribution into a light spot with isotropic optical intensity distribution. Hence, it is inevitable for achievement of the required optical head at low costs to reduce the requisite number of associative optical components while simultaneously reducing production costs thereof.

SUMMARY OF THE INVENTION

It is therefore an object of the present invention to provide a new and improved optical head assembly capable of avoiding the problems faced with the prior art and also optical read/write apparatus using the same.

It is another object of the present invention to provide an optical head and optical information media record/reproduction apparatus using the same, which head is adaptable for use in recording or retrieving information to or from optical information storage media by using a plurality of laser light source units and is capable of reducing any appreciable aberration by forcing an incoming laser beam from a semiconductor laser as disposed outside of an optical axis to fall onto a focusing lens substantially at right angles thereto while avoiding a need to employ additional optical components of high costs.

To attain the foregoing objects, the present invention provides an optical head which comprises a plurality of laser light sources different in wavelength from each other, a mirror for permitting reflection of a plurality of laser beams as emitted from the laser light sources, and optical convergence means including but not limited to a focusing lens for focusing the plurality of laser beams reflected off from the mirror into optical spots on an optical information storage medium such as an optical disk or the like, wherein the mirror includes a plurality of reflection planes for reflection of laser beams of different wavelengths, and wherein the plurality of reflection planes are arranged in nonparallel to each other thereby allowing the plurality of laser beams incoming from different directions to be reflected off toward substantially the same direction.

An optical head is also provided which comprises a plurality of semiconductor laser chips, a collimating lens for converting a plurality of laser beams radiated from the semiconductor laser chips to parallel rays of light, and optical convergence means such as a focusing lens or other similar suitable optical components for focusing the plurality of laser beams into optical spots on an optical information storage medium such as an optical disk or the like, wherein a beam reshaping prism that functions to enlarge a width of each of the laser beams in a direction along an array of the plurality of semiconductor laser chips is disposed between the collimate lens and the optical convergence means.

An optical head is also provided which comprises a plurality of semiconductor laser chips different in wavelength, a collimating lens for converting a plurality of laser beams radiated from the semiconductor laser chips to parallel rays of light, a mirror for permitting reflection of the plurality of laser beams, and optical convergence means such as a focusing lens for focusing the plurality of laser beams reflected from the mirror into an optical spot on an optical information storage medium typically including an optical disk or the like, wherein a beam reshaping prism that enlarges a width of each of the laser beam in a direction along an array of the plurality of semiconductor laser chips is disposed between the collimating lens and the optical convergence means, wherein the mirror includes a plurality of reflection planes for reflection of laser beams of different wavelengths, and wherein these reflection planes are in nonparallel to each other thereby allowing the plurality of laser beams incoming from different directions to be reflected off toward substantially the same direction.

Either one of said mirror and said beam reshaping prism is disposed as a rise-up mirror for use in introducing laser beams into the optical convergence means.

DESCRIPTION OF THE EMBODIMENTS

A first embodiment of the present invention will be explained with reference to FIGS. 1 to 6 and 13 below.

Figure 1:
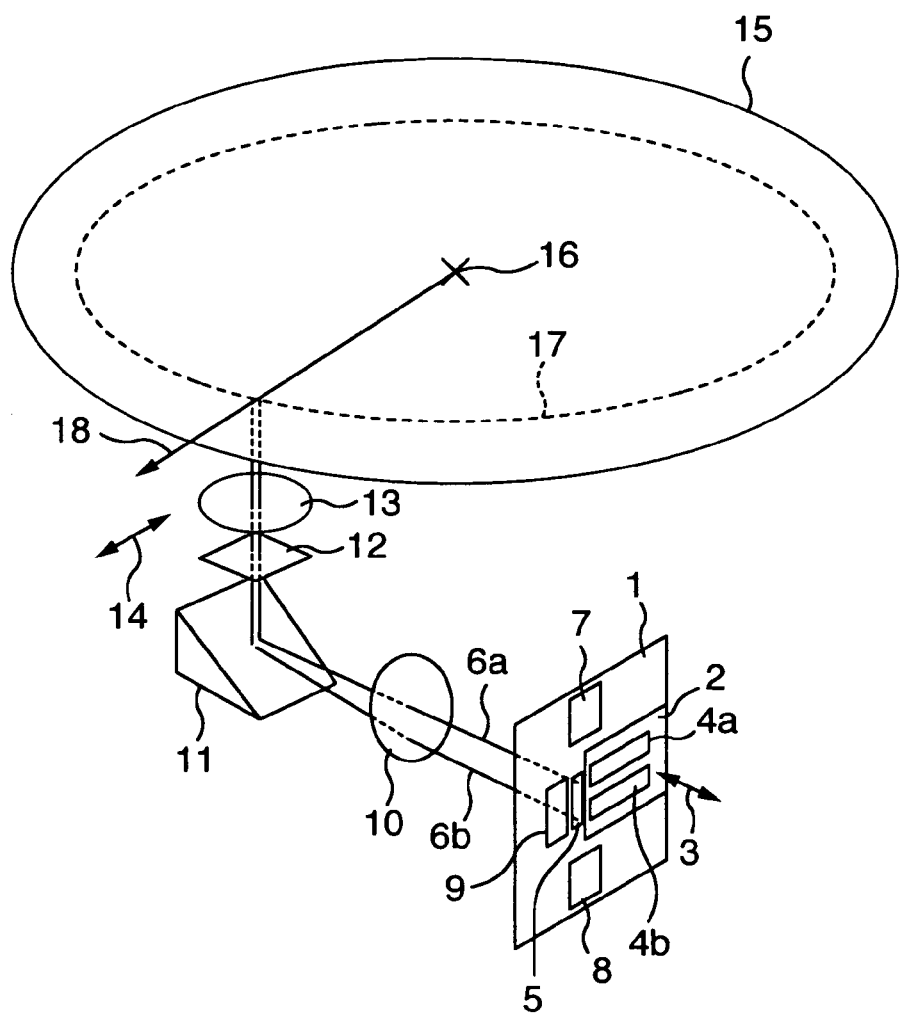
FIG. 1 is a diagram showing a configuration of an optical disk drive device employing an optical head assembly in accordance with the present invention.
Figure 2:
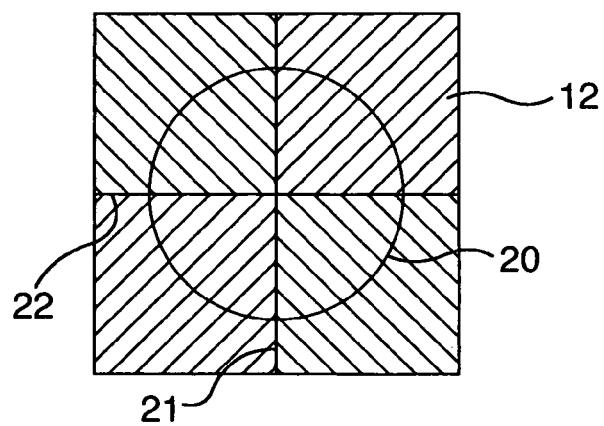
FIG. 2 is a diagram for explanation of an operation of a diffraction grating portion of a composite element used in the optical head shown in FIG. 1.

Referring to FIG. 1, there is shown a basic structure of an optical disk drive device incorporating the principles of the invention and also an optical head assembly employed therein. Reference numeral "1" is used herein to designate a semiconductor substrate having its surface on which an optical detector element and electronic circuit along with any other constituent parts or components are formed with more than one laser chip or the like being attached thereto, wherein the substrate may preferably be made of silicon or the like. In actual implementation, the semiconductor substrate 1 is disposed so that its back surface is toward the surface of the paper of the drawing sheet and, thus, its front surface is invisible; however, for purposes of convenience of illustration only, the depiction has been prepared so that the substrate's front parts-mount surface configuration is made visible from its back surface side by through-view illustration techniques. Numeral 2 denotes a laser chip mount surface, which is fabricated by chemically processing through etching treatment the surface of the semiconductor substrate 1 to a depth ranging from 30 to 100 micrometers (μm), wherein the laser chip mount surface 2 lies in parallel to the surface of semiconductor substrate 1. Arrow 3 indicates a normal direction to the laser chip mount surface 2. Reference character 4a designates a semiconductor laser chip adaptable for use with digital versatile discs (DVDs), which gives off a laser beam 6a that measures 660 nanometers (nm) in wavelength λa; 4b denotes another semiconductor laser chip adapted for use with recordable compact discs, typically known as compact disc-recordable (CD-R) in the optical storage media art, which emits a laser beam 6b of its wavelength λb=780 nm. The semiconductor laser chips 4a and 4b are rigidly secured by soldering to the laser chip mount surface 2. Numeral 5 is a semiconductor mirror surface or plane that is formed between the semiconductor substrate 1's surface and the laser chip mount surface 2, wherein the mirror plane may be fabricated by etching techniques at the same time that the laser chip mount surface 2 is formed. After having been emitted from the semiconductor laser chip 4a, the DVD laser beam 6a is reflected on the semiconductor mirror plane 5 to reach a collimating lens 10, which converts this reflection light into parallel rays of light. Similarly, the CD laser beam 6b is such that after leaving the semi-conductor laser chip 4b, this beam is reflected at the semiconductor mirror plane 5 to enter the collimating lens 10, which then converts resultant reflection light to parallel rays of light. 7 denotes an optical detection element for use in obtaining a focusing deviation/error detection signal; 8 is an optical detector element for generation of a tracking error detection signal and information reproduction or playback signals; 9, an optical detector for use in monitoring the light emission amount of each of the semiconductor laser chips 4a and 4b, a respective one of these photodetectors 7–9 being formed on the surface of the semiconductor substrate 1. 11 is a mirror for reflection of the laser beams 6a and 6b. 12 is a composite element with an assembly of a four-divided diffraction grating offering certain polarizabilities and a quarter wavelength ($\lambda/4$) plate being surface-6a and 6b as emitted from the semiconductor laser chips 4a, 4b are such that when reaching the composite device of the four-divided diffraction grating with polarizability and the $\lambda/4$ plate stated supra, the beams behave as ordinary rays of light which directly pass through polarizable diffraction grating portions without exhibiting any diffraction to be converted to circularly polarized light by the $\lambda/4$ plate of the composite device 12. Reflected rays of such laser beams 6a, 6b at the optical disk become extraordinary light rays through the $\lambda/4$ plate of the composite device 12 and are then diffracted by the four-divided diffraction grating with polarizability. FIG. 2 shows one exemplary diffraction grating pattern of the four-divided diffraction grating of the composite device 12, which is subdivided by boundary lines 21 and 22 into four separate regions. A circle 20 shown herein indicates a laser beam 6a or 6b, which is split by the four-divided diffraction grating into four primary diffracted light rays with the positive polarity (+) and four primary diffracted rays of the negative polarity (−).

Figure 3A:
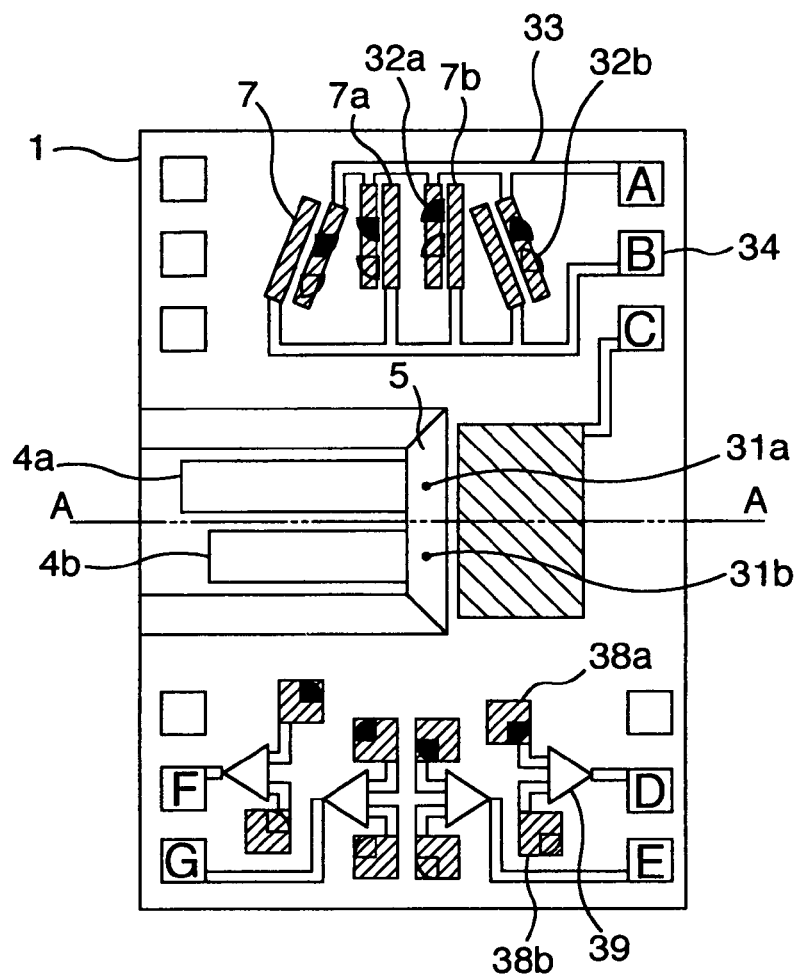
FIG. 3A is a diagram showing a plan view of a semiconductor substrate used in the optical head of FIG. 1.

Turning to FIG. 3A, there is shown a parts-mount surface of the semiconductor substrate 1 when looking at from the side of collimating lens 10. In FIG. 3A, eight quarter-circle marks 32a with solid black shading applied thereto are used to designate those laser beams of wavelength $\lambda$a, which are reflected on the optical disk and then split by the diffraction grating; eight quarter circles 32b with no shading applied thereto denote laser beams of wavelength $\lambda$b which are reflected at the optical disk and then split by the diffraction grating. The optical detector shown by numeral 7 in FIG. 1 is in detail a group of optical detectors including four pairs of photodetectors, each pair consisting of two light-sensitive elements 7a and 7b opposing each other, each of which has an elongated rectangular photosensitive area, wherein the individual one of them is operable to receive either one of the laser beam 32a of wavelength $\lambda$a and laser beam 32b of wavelength $\lambda$b. A focusing error detection method as used therein employs the so-called Foucault knife-edge techniques based on four-split beam schemes, wherein a focus-error detection signal is obtainable through differential processing of output signals of two photosensitive elements in each pair. The illustrative embodiment, however, is specifically arranged so that the intended focus error signal is obtained by connecting such photosensitive elements together by a conductive thin-film lead 33 made for example of aluminum in the way shown in FIG. 3A and then executing differential processing of output signals as derived from a terminal A and terminal B of wire bonding pads 34. In this way, four focus error detection signals are thus obtained from the four pairs of photosensitive elements, which signals are then combined or "composed" together to provide a stable focus error detection signal which may exhibit stability even when the focusing lens is shifted in position or displaced in radial directions of the optical disk, wherein such lens position deviation can occur due to effectuation of tracking control. 9 denotes the optical detector for monitoring the light emission amount of the semiconductor laser chips 4a and 4b, wherein an output signal of the photodetector 9 will be output from a terminal C of pad 34. Points 31a and 31b designate reflection positions on the semiconductor mirror plane 5 whereat the laser beams 6a and 6b emitted from the semiconductor laser chips 4a, 4b are to be reflected off. For instance, supposing that all of the four regions shown in FIG. 2 are equal in diffraction grating pitch P while letting the diffraction grating direction be given as $+\alpha$, $-\alpha$, $+3\alpha$, and $-3\alpha$ degrees with respect to a longitudinal line 21 and also letting the collimating lens's focal distance be represented by fc, the laser beam 32a of wavelength $\lambda$a as split by the diffraction grating is expected to be focused at a specified position that is on a circle with the point 31a being as its center and with its radius equal to Ra=fc·$\lambda$a/P and is spaced by a distance of $2\alpha$ degrees from the center. Similarly the laser beam 32b of wavelength $\lambda$b split by the diffraction grating is to be focused at a position that is on a circle with the point 31b as its center and with its radius of Rb=fc·$\lambda$b/P and is spaced by $2\alpha$ degrees from the center. By letting a light emission point-to-point distance D of the semiconductor laser chips 4a and 4b, which corresponds to the distance between the points 31a and 31b, be nearly equal to fc·($\lambda$b−$\lambda$a)/P, it becomes possible to permit the focussing position of such laser beam of wavelength $\lambda$a to be substantially identical to that of the laser beam of wavelength $\lambda$b, which in turn makes it possible to allow common use of photosensitive elements and amplifiers among those beams of different wavelength values as in this embodiment, while at the same time saving the surface of the semiconductor substrate 1 and also reducing the requisite number of wire bonding pads and output leads to thereby advantageously facilitate miniaturization or "down-sizing" of a package structure for use in accommodation of the semiconductor substrate 1.

The photodetector 8 shown in FIG. 1 for use in obtaining a tracking error detection signal and information playback signals is configured from photo-sensitive elements 38a and 38b. The photosensitive elements 38a include four photosensors that are optically sensitive to the incoming laser beam 32a whereas the remaining photosensitive elements 38b likewise include four photosensors that receive the laser beam 32b, wherein output signals of photosensors 38a and 38b are input to an amplifier circuit 39 as formed on the semiconductor substrate 1. In cases where the semiconductor laser chip 4a is presently rendered operative to emit light, those signals of the photosensors 38a are output to terminals D, E, F and G of pads 34; alternatively, while the semiconductor laser chip 4b is emitting light, signals of photosensors 38b are passed to the terminals D–G of pads 34. As the optical detector 7 in this embodiment is arranged so that photodetectors are commonly useable for those beams of different wavelengths while the optical detector 8 and amplifier 39 in this embodiment are such that the amplifier is useable in common for beams of different wavelengths, it is thus possible to save the surface of the semiconductor substrate 1 while simultaneously reducing the requisite number of wire bonding pads and output leads to thereby advantageously facilitate successful down-sizing of a package structure for receiving the semiconductor substrate 1 therein.

Figure 3B:
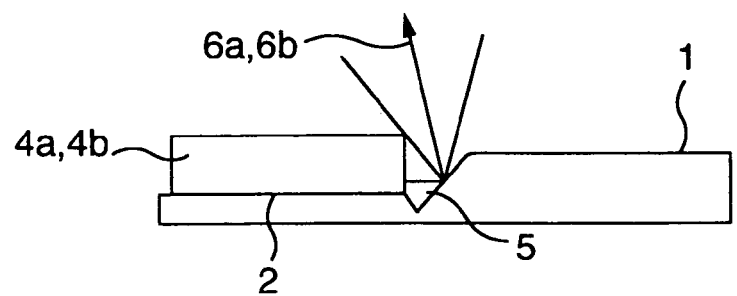
FIG. 3B depicts a cross-sectional view of the substrate shown in FIG. 3A.

See FIG. 3B, which depicts a cross-sectional structure of the semiconductor substrate 1 as taken along dotted line A–A' in FIG. 3A. Preferably the semiconductor mirror 5 is formed so that it is at 45 degrees to the laser-chip amount surface 2. Machining of the silicon mirror surface is based on so called anisotropic etching treatment, that the etching rate at the (111) plane is greatly less than that on the (100) plane by a significant degree corresponding to two orders of magnitude. The (100) plane of silicon etched by potassium hydroxide-based water solution would result in the fabrication of a rectangular prismoid or "pyramid"-shaped concave portion having a trapezoid-like profile with a flat (111) plane as its slanted surface. At this time an angle that the (111) plane forms with the (100) plane is about 54°; thus, in order to fabricate a semiconductor mirror of 45 degrees, it is required to employ a specific silicon substrate of approximately 9 degrees in off-angle value with its crystal axis being slanted or tilted relative to the surface thereof, by way of example. However, it should be required that such off-angle be determined by taking account of adaptability of semiconductor processes for fabrication of photosensitive elements and electronics circuit: In some cases, the semiconductor mirror 5 can be displaced from 45 degrees; in other cases, the ray-exit direction of the laser beams 6a, 6b can be deviated or offset from the perpendicular direction to the semiconductor substrate 1.

Figure 4A:
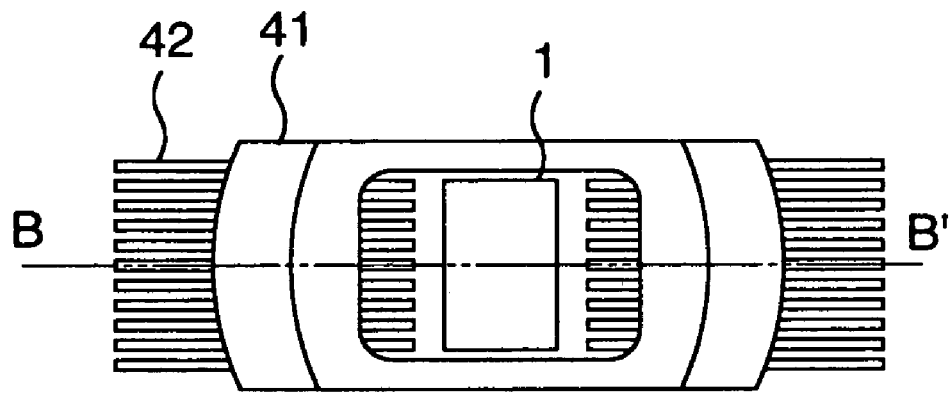
FIG. 4A illustrates a plan view of a package of FIG. 1.
Figure 4B:
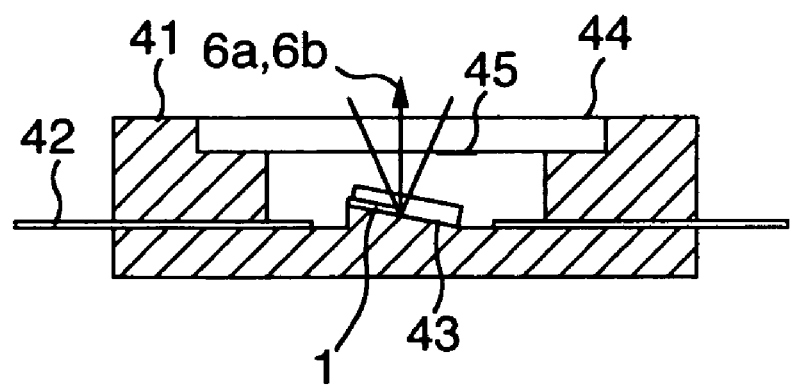
FIG. 4B is a sectional view of the package.

Turning now to FIG. 4A, there is shown a planar structure of a package 41 that accommodates the semiconductor substrate 1 therein. Also see FIG. 4B, which depicts a sectional view of the package taken along dotted line B–B' in FIG. 4A. Numeral 42 as used herein refers to electrical leads that are connected via associative bonding wires to the pads 34 on the semiconductor substrate 1 shown in FIG. 3A. A support bonded together, wherein the four-divided diffraction grating with polarizability is disposed in such a manner as to face the side of the semiconductor laser chips. The four-divided diffraction grating may be constituted from a birefringent optical crystal plate and/or liquid crystal (LC) plate, by way of example, which functions to cause incident rays of ordinary light to penetrate therethrough without any diffraction and, in the case of extraordinary light, serves as the diffraction grating required. 13 is a focusing lens, which may typically be an incident beam diameter-variable lens, a lens with a holographic element added to its incoming light reception side, a lens with a holographic element and/or more than one ring-like band groove added to its light incidence side, or other similar suitable lenses, to thereby offer compatibility with both DVDs and CDs, including CD-R disks, wherein DVDs measure 0.6 mm in substrate thickness and 660 nm in use wavelength and also 0.6 in numerical aperture (NA) whereas CDs are 1.2 mm in substrate thickness and 780 nm in use waveform with its numerical aperture of about 0.5. 15 shows a presently loaded optical storage disk, such as a DVD, CD-R or CD. 16 designates the center of rotation of the optical disk (also referred to as "disc" in some cases) 15; dotted-line circle 17 denotes an information/data recording track; and, arrow 18 indicates a radial direction of the optical disk 15.

In the illustrative embodiment the laser beams base portion or "pedestal" 43 for mounting thereon the semiconductor substrate 1 has a slanted top surface to ensure that the ray-exit direction of any one of the laser beam 6a, 6b becomes identical to the perpendicular direction to the surface of the package 41. 44 is a glass cover for sealing the semiconductor substrate 1, wherein a reflection plane 45 is provided inside of the glass cover 44 for permitting reflection of outer peripheral portions of the laser beams 6a and 6b. Reflected beams from the reflection plane 45 are guided to reach the photodetector 9 on the semiconductor substrate 1, which generates and issues an electrical signal for use in monitoring the light emission amount of each of the semiconductor laser chips 4a and 4b.

Figure 5A:
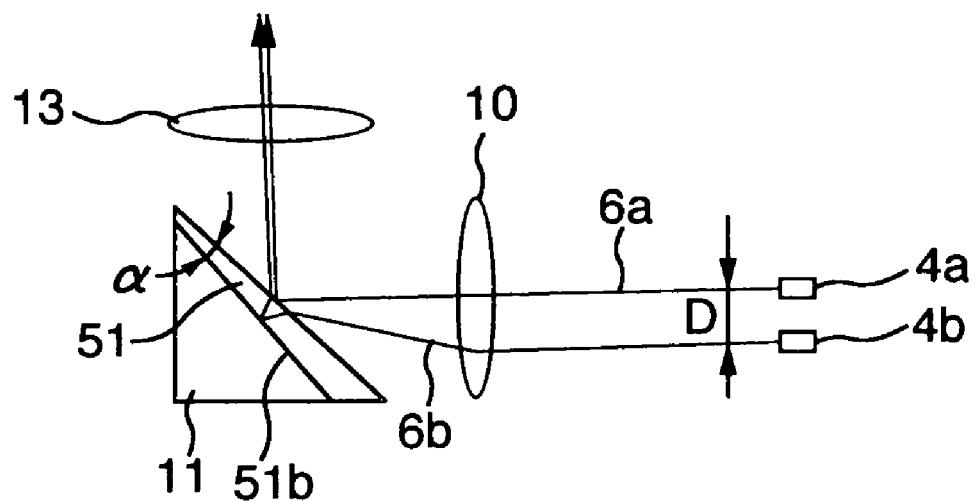
FIGS. 5A and 5B are diagrams each showing a configuration of major part of an optical head in accordance with a first embodiment of the invention.
Figure 5B:
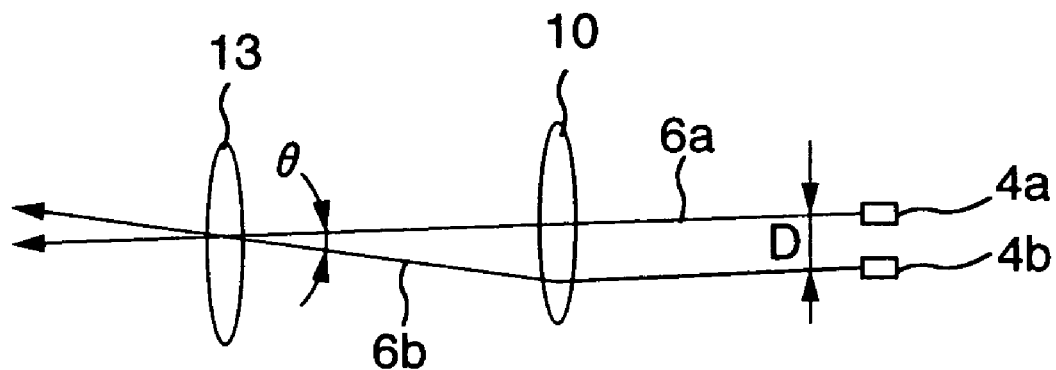

An explanation will now be given of the principles of the present invention in conjunction with FIGS. 5A and 5B. FIGS. 5A–5B each show an optical path spanning from the light source module up to the focusing lens of the optical head embodying the invention shown in FIG. 1, wherein the semiconductor mirror 5 and composite device 12 are eliminated from the illustration. FIG. 5A shows a certain case where a double mirror 11 is present whereas FIG. 5B shows another case where such double mirror 11 is absent. As typical semiconductor laser chips measure about 250 μm in width, the distance D between the light emission points of the semiconductor laser chips 4a and 4b is 300 μm by way of example. In addition, the focal distance fc of the collimating lens 10 is 20 mm, for example. As shown in FIG. 5B, in case the semiconductor laser chip 4a is disposed on the optical axis of the collimating lens 10, a laser beam 6a emitted from the semiconductor laser chip 4a travels straightly to hit the focusing lens 13 at right angles thereto; thus, any appreciable aberration will hardly take place. On the contrary, a laser beam 6b emitted by the semiconductor laser chip 4b diagonally reaches the focusing lens 13 at an angle θ=arctan(D/fc)=0.86° so that aberration (in particular, coma aberration) tends to readily occur. To avoid this, the illustrative embodiment makes use of the double mirror 11 shown in FIG. 5A. The double mirror 11 has a reflection plane 51a and reflection plane 51b, wherein the former is for permitting reflection of the laser beam 6a of 660-nm wavelength while causing the laser beam 6b of 780-nm wavelength to simply pass therethrough whereas the latter is for reflection of the 780-nm wavelength laser beam 6b. The reflection plane 51a is formed for example of a dichroic mirror with more than one dielectric thin-film laminated, and is disposed at an angle of 45° relative to the incoming laser beam 6a. On the other hand the reflection plane 51b is a mirror made of aluminum, for example, which forms a specified angle α with the reflection plane 51a.

Figure 6:
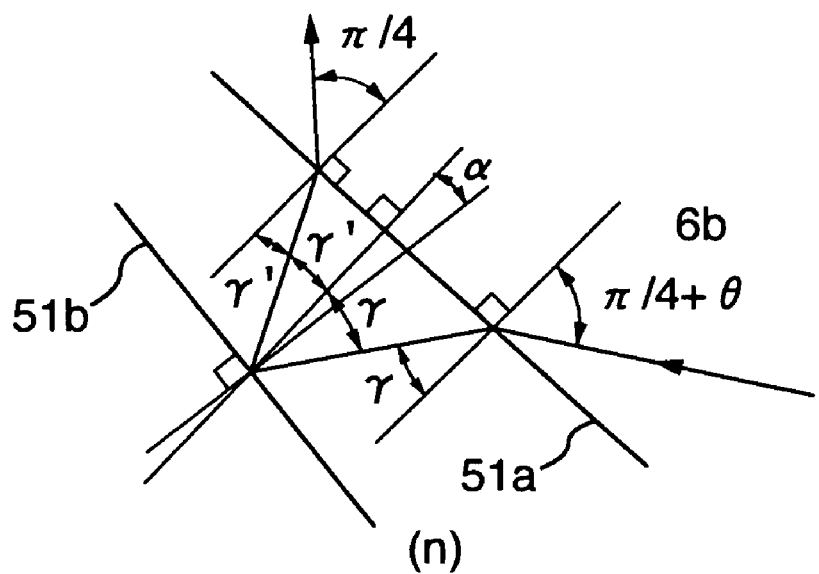
FIG. 6 is a diagram showing principles of the invention in the first embodiment.

As shown in FIG. 6, an angle of refraction γ of the laser beam 6b falling onto the reflection plane 51a is given as: sin γ=sin(π/4+θ)/n, where n is the refractive index of a material lying between the reflection plane 51a and reflection plane 51b with respect to the laser beam 6b. When leaving the reflection plane 51a, the beam exhibits an angle of incidence γ' with respect to reflection plane 51, which is represented by: sin γ'=sin(π/4)/n. Thus, according to the law of reflection, a specific angle of the laser beam 6b at the reflection plane 51b which satisfies γ−α=γ'+α—that is, α=(γ−γ')/2—is obtainable. One example is that when n=1.5 and θ=0.86°, then α=0.23°. Use of the double mirror 11 that has the reflection plane 51b leaned by an angle α=0.23° with respect to the reflection plane 51a forces the laser beam 6b, which is tilted at an angle α=0.86° relative to the laser beam 6a, to be in almost completely parallel to the laser beam 6a and thus fall onto the focus lens 13 at right angles thereto, thereby enabling suppression or minimization of appreciable aberration.

Figure 13A:
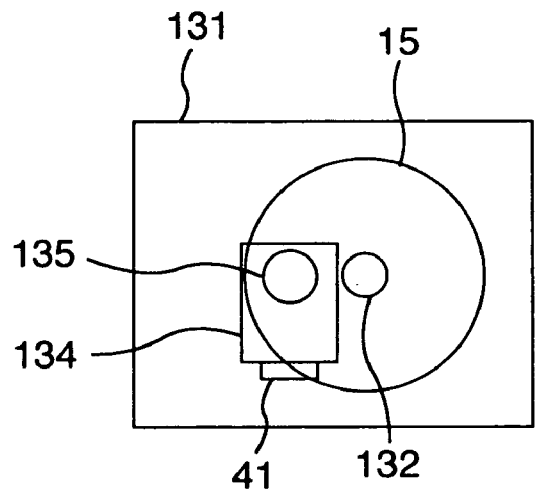
FIG. 13A is a plan view of an optical disk drive device using the optical head embodying the invention.
Figure 13B:
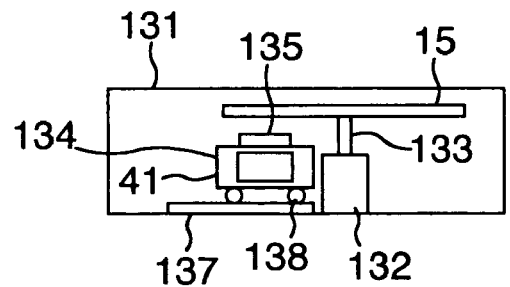
FIG. 13B is a sectional side view thereof.

See FIGS. 13A–B, which shows a structure of an optical disk drive device incorporating the principles of the instant invention, wherein FIG. 13A is a top plan view whereas FIG. 13B is a side view in cross-section. Numeral 131 refers to an enclosure or housing structure of such optical disk device. 132 designates a motor as attached to the housing 131 of the optical disk device for rotation of an optical disk 15 via a shaft 133. 134 denotes an optical head assembly, wherein a package 41 receiving therein the semiconductor substrate 1 and a lens actuator 135 with the focusing lens 13 are attached. 136 is an access mechanism attached to the optical head 134; 137 is a rail attached to the housing 131 of the optical disk device. The optical head 134 is movable by the access mechanism 136 on the rail 137 in radial directions of the optical disk 15. The optical head 134 contains therein a collimating lens 10 and double mirror 11 plus composite device 12. The package 41 includes built-in semiconductor laser chips 4a and 4b, either one of which is rendered operative to emit a laser beam 66a or 66b, which is given off from the optical head 134 through the focusing lens 13 of the lens actuator 135 to thereby illuminate the optical disk 15 being presently driven to rotate. A reflection beam of it is optically guided to reach the optical head 134 via the focusing lens 13 again, part of which is received by an optical detector element 7 as mounted in the package 41 to thereby obtain a focusing error detection signal. Another part of the reflection beam is received by the optical detector 8 also built in the package 41, which then generates a tracking error detection signal and information playback signal(s).

Figure 7:
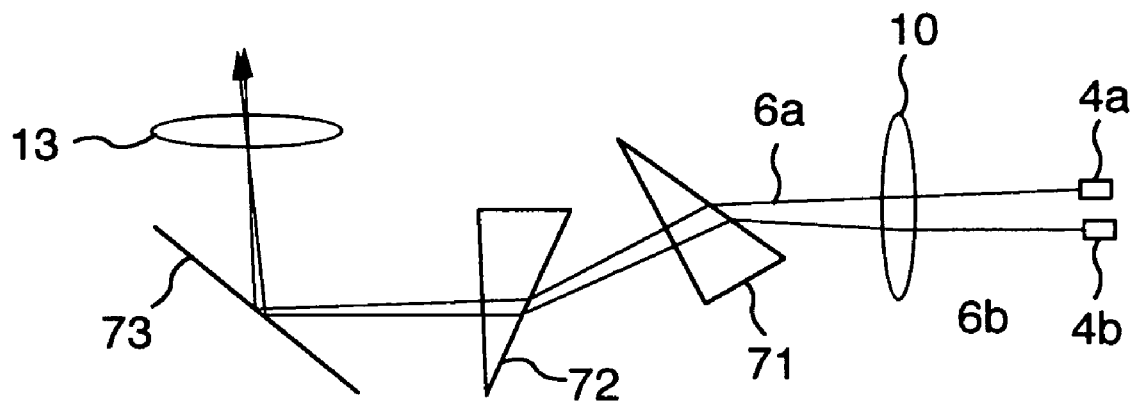
FIG. 7 is a diagram showing a configuration of major part of an optical head in accordance with a second embodiment of the invention.
Figure 8:
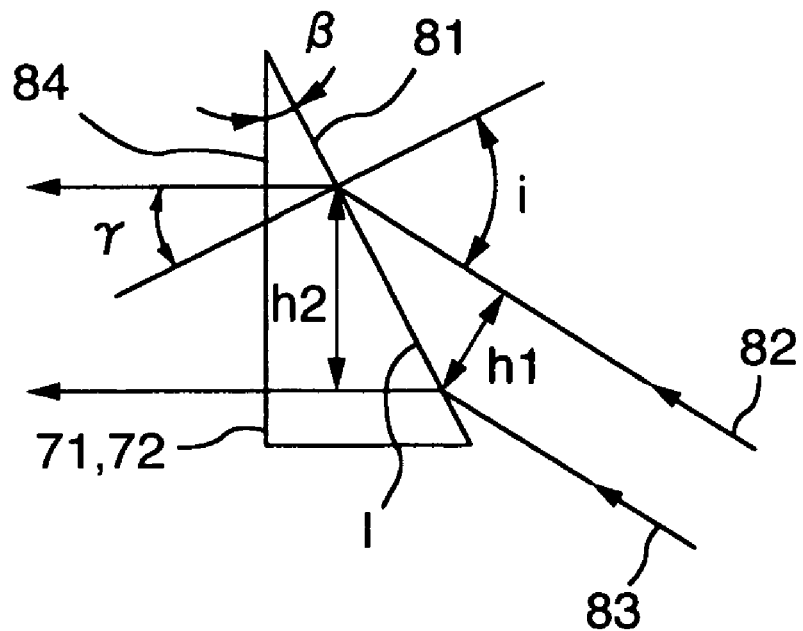
FIG. 8 is a diagram showing principles of the invention in the second embodiment.

A second embodiment of the present invention will next be explained with reference to FIGS. 7 and 8. FIG. 7 is a diagram showing the optical path of an optical head employing, in place of the mirror 11 of FIG. 5, a couple of beam reshaping prisms 71 and 72 in accordance with the invention, wherein the semiconductor mirror 5 and composite device 12 shown in FIG. 1 are eliminated from the illustration of the diagram. The light emission (flux) intensity distribution of the semiconductor laser chips 4a and 4b is anisotropic in that it is wide (i.e., has a major axis) in the direction perpendicular to the paper of the drawing sheet and narrow (i.e., has a minor axis) in directions on the paper (i.e., the anisotropic light flux distributions of the chips are oriented such that a major (or minor) axis of the plural distributions are pre-positioned at a common angle or direction). Numeral 10 designates a collimating lens; 13 denotes a focusing lens. 71 and 72 denote such beam reshape prisms for use in enlarging the beam width (i.e., enlarging the fluxes) of each laser beam 6a, 6b in directions on the paper of the drawing sheet to thereby provide isotropic optical intensity distribution 73 is an ordinary or standard mirror.

The principles of the present invention will be explained with reference to FIG. 8. The refractive index n of the prism 71 or 72 is given by $n \cdot \sin \gamma = \sin i$, where i is the angle of incidence at an incidence plane 81, and $\gamma$ is the refractive angle. In addition, letting a distance between two light rays 82 and 83 prior to incidence to the prism be represented by h1, a distance inside of such prism be indicated by h2, and a distance between incidence points of the light rays 82 and 83 on the incidence plane 81 be given by $\lambda$, then the beam width expansion factor m is represented as $m = \cos \gamma / \cos i$, since $h1 = \lambda \cdot \cos i$, $h2 = \lambda \cdot \cos \gamma$. Letting an apical or vertex angle of the prism be $\beta = \gamma$, it becomes a beam reshape prism of vertical light emission. Let minimal or "micro" modification at incidence angle i be $\Delta i$, and let micro-modification at refractive angle $\gamma$ be $\Delta \gamma$; then, we obtain $n \cdot \sin(\gamma + \Delta \gamma) = \sin(i + \Delta i)$ Finally, $n \cdot \Delta \gamma = \Delta i / m$ is obtained. Additionally, letting the micro-modification from vertical outward light emission at the light-outgoing plane 84 be $\Delta j$, the law of refraction on such plane 84 suggests $\Delta j = n \cdot \Delta \gamma$. Hence, $\Delta j = \Delta i / m$. Thus, use of the prism of beam width expansion factor m makes it possible to reduce the beam's angular modification to 1/m.

For example, suppose that the light emission intensity distribution of the semiconductor laser chips 4a and 4b is at 30 degrees in the direction at right angles to the paper of the drawing sheet, and 10 degrees in a direction on the paper. Also assume that the prisms 71 and 72 are fabricated so that each is made of glass of its refractive index n=1.5 and has its vertex angle of $\beta$=36.14 degrees while disposing these prisms so that the incidence angle i to each prism is defined by i=62.2 degrees. If this is the case, the resulting beam width expansion factor m of each prism becomes equal to m=31/2, which ensures that the outgoing beam exhibits isotropic light intensity distribution due to the actions of two prisms 71 and 72. In addition, in case the semiconductor laser chip 4a is laid out on the optical axis of the collimating lens 10 with the light emission point distance D of semiconductor laser chips 4a and 4b being set at 300 μm and with the focal distance fc of collimating lens 10 set at 20 mm, a laser beam 6b leaving the semiconductor laser chip 4b is expected to reach the prism 71 at an angle of 0.86° when compared to a laser beam 6a. However, due to the action of the beam reshape prisms 71 and 72 embodying the invention, the inclination of such laser beam 6b after leaving the prism 72 becomes 0.29°. For this reason, it becomes possible by use of the prisms of this invention to permit the inclination or gradient of the laser beam 6b falling onto the focus lens 13 to drop down at one third, which in turn makes it possible to let appreciable coma aberration or the like hardly take place.

Figure 9:
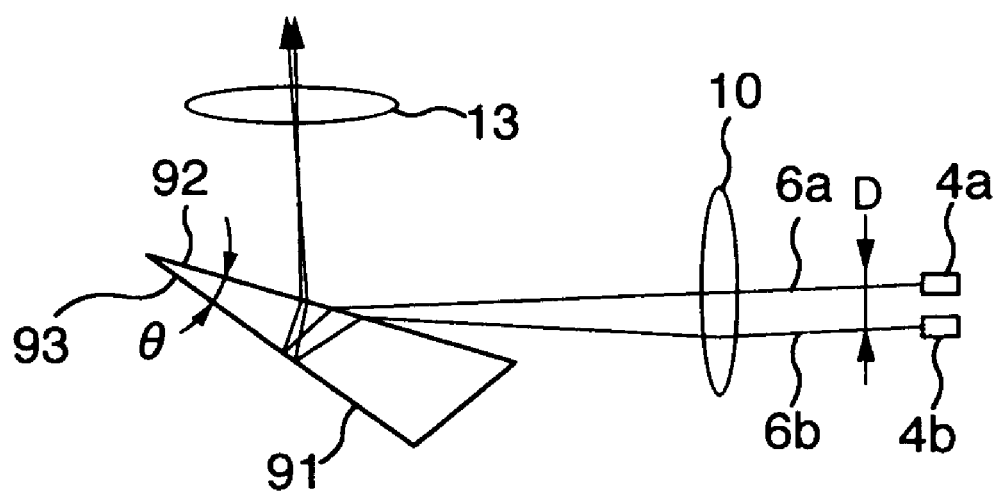
FIG. 9 shows a configuration of major part of an optical head in accordance with a third embodiment of the invention.
Figure 10:
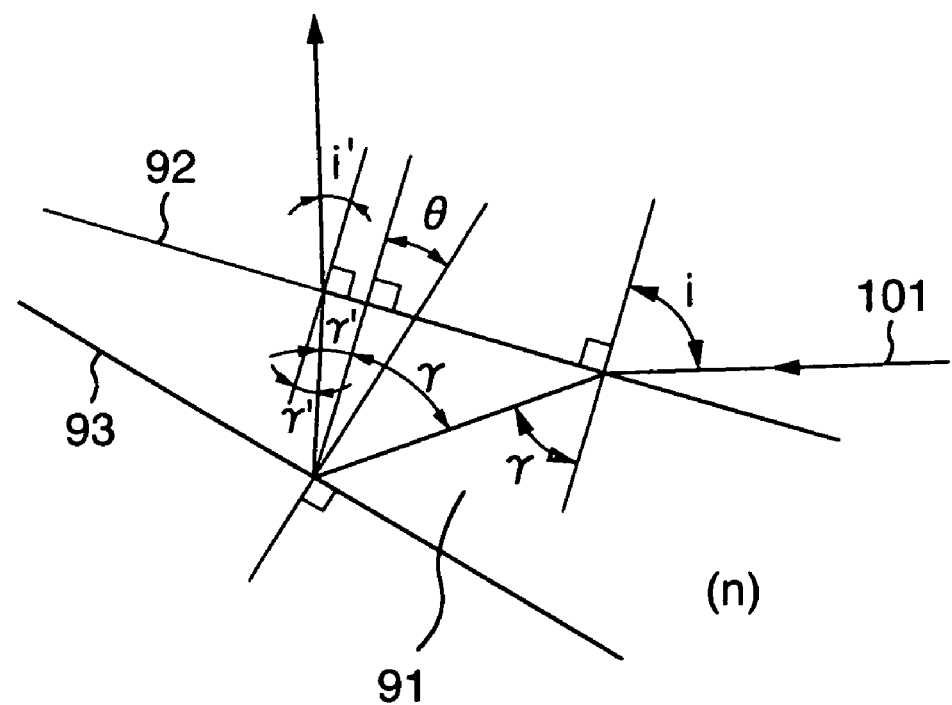
FIG. 10 is a diagram showing principles of the invention in the third embodiment.

A third embodiment of the present invention will be explained with reference to FIGS. 9 and 10. FIG. 9 is a diagram showing the optical path of an optical head employing, in place of the beam reshape prisms 71 and 72 of FIG. 7, a mirror prism 91 in accordance with the invention, wherein the semiconductor mirror 5 and composite device 12 shown in FIG. 1 are omitted from the illustration of the optical path diagram. The light emission intensity distribution of the semiconductor laser chips 4a and 4b is wide in the direction perpendicular to the paper of the drawing sheet and yet narrow in directions on the paper. Numeral 10 designates a collimating lens; 13 denotes a focusing lens. The mirror prism 91 is designed to have a refractive plane 92 for refraction of laser beams 6a and 6b along with a reflective plane 93 for reflection, wherein a vertex angle the refractive plane 92 forms with the reflective plane 93 is given as $\theta$. The reflective plane 93 has a reflective film made, for example, of aluminum as deposited thereon. The mirror prism 91 has a beam reshaping function for enlarging the beam width of laser beams 6a and 6b in those directions on the paper of the drawing sheet to thereby provide isotropic light intensity distribution and also has a function of letting an incoming beam or beams be reflected off toward the vertical direction.

The principles of the present invention will be explained with reference to FIG. 10. Let the incident angle of a laser beam 101 falling onto the mirror prism 91 be represented by i, refractive angle be $\gamma$, incident angle of the laser beam 101 leaving the mirror prism 91 be $\gamma'$, angle of outgoing light be i', and the refractive index of mirror prism 91 be given as n; then, the law of refraction suggests $n \cdot \sin \gamma = \sin i$, $n \cdot \sin \gamma' = \sin i'$. In addition, since the reflective plane 93 is inclined or tilted at the angle $\theta$ relative to the refractive plane 92, $\gamma - \theta = \gamma' + \theta$ is obtained. The condition for letting the laser beam 101 outgo in the direction perpendicular to the incidence angle thereof is given by: $i + i' = \pi/2$. From the equation above, we obtain $\theta = 1/2 \cdot [\arcsin(1/n \cdot \sin i) - \arcsin(1/n \cdot \cos i)]$. Further, the beam width expansion factor m1 in the event of incidence is represented by $m1 = \cos \gamma / \cos i$ whereas the beam width expansion factor m2 upon leaving is given as $m2 = \cos i' / \cos \gamma'$; thus, the beam width expansion factor M of the mirror prism 91 must be $M = m1 \cdot m2 = \cos \gamma / \cos i \cdot \cos i' / \cos \gamma'$. Additionally, let minimal or "micro" modification at incidence angle i be $\Delta i$, micro-modification at refractive angle $\gamma$ be $\Delta \gamma$, micro-modification at incidence angle $\gamma'$ be $\Delta\gamma'$, and micro-modification at light-exit angle i' be $\Delta i'$; then, we obtain $n \cdot \sin(\gamma+\Delta\gamma)=\sin(i+\Delta i)$, $n \cdot \sin(\gamma'+\Delta\gamma')=\sin(i'+\Delta i')$, $(\gamma+\Delta\gamma)-\theta=(\gamma'+\Delta\gamma')+\theta$. From the above equation involving micro-modification(s), $\Delta i'=\cos\gamma/\cos i \cdot \cos i'/\cos\gamma' \cdot \Delta i$ is obtainable; finally, we obtain $\Delta i'=\Delta i/M$. After all, use of the mirror prism 91 of beam width expansion factor M makes it possible to reduce angular modifications of beams down at 1/M.

For example, suppose that the light emission intensity distribution of the semiconductor laser chips 4a and 4b is at 30 degrees in the direction at right angles to the paper of the drawing sheet, and 10 degrees in a direction on the paper. Assume that the mirror prism 91 is fabricated by using a glass material of its refractive index n=1.5 and exhibits a geometry with a vertex angle of θ=15.29 degrees while disposing it so that the incidence angle i to mirror prism 91 is defined by i=75.5 degrees. If this is the case, the resultant beam width expansion factor M of mirror prism 91 becomes equal to M=3, which insures that the resulting light intensity distribution of outgoing beam is rendered isotropic-namely, equal in beam width in all directions mirror 113 having its reflective plane 114a for reflection of the laser beam 6a and a reflection plane 114b for reflection of the laser beam 6b to thereby permit such two laser beams to be reflected off toward the same direction, in a way similar to that of the double mirror 11 shown in FIG. 5.

In the case of recording or playing back information to or from an optical disk such as CD-R or else, an optical spot being focused on the optical disk is preferably of a round shape rather than elliptical or "oval" shapes in some cases. In the illustrative embodiment, since it is possible to freely design the significance of the beam width expansion factor due to the beam reshape prisms 111 and 112, it becomes possible to form spots of any desired profiles including not only round shapes but also oval shapes while at the same time enabling such two beams to straightly reach the focusing lens 13 at right angles thereto.

Figure 12:
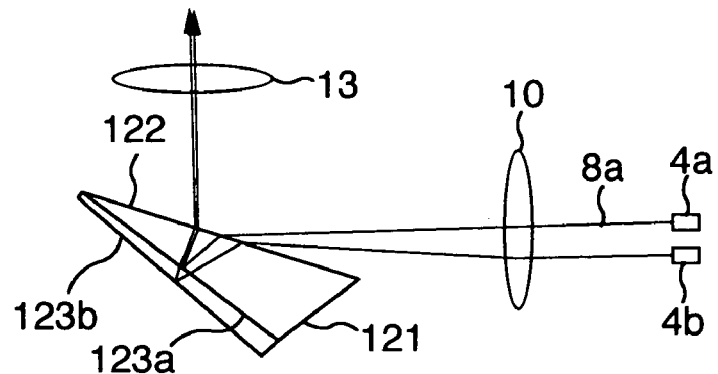
FIG. 12 is a diagram showing a configuration of major part of an optical head in accordance with a fifth embodiment of the invention.

A fifth embodiment of the invention will be explained with reference to FIG. 12. Numeral 121 denotes a double mirror prism that serves to expand the beam width in directions on the paper of the drawing sheet by refraction at its refractive plane 122, as in the mirror prism 91 shown in FIG. 9. In the third embodiment of FIG. 9, the laser beam 6b leaving the mirror prism 91 is tilted at 0.29° relative to the remaining laser beam 6a; thus, slight coma aberration or else can occur when letting the focusing lens 13 focus concerned. In addition, in case the semiconductor laser chip 4a is disposed on the optical axis of the collimating lens 10 with the light emission point distance D of semiconductor laser chips 4a and 4b being set at 300 μm and with the focal distance fc of collimating lens 10 set at 20 mm, a laser beam 6b emitted from the semiconductor laser chip 4b is expected to reach the mirror prism 91 at an angle of 0.86° when compared to laser beam 6a. However, due to the action of the mirror prism 91 embodying the invention, the inclination of such laser beam 6b after leaving the mirror prism 91 becomes 0.29°. It thus becomes possible by use of the prism embodying the invention to permit the inclination or gradient of the laser beam 6b falling onto the focusing lens 13 to drop down at one third, which in turn makes it possible to let appreciable coma aberration or the like hardly take place.

Figure 11:
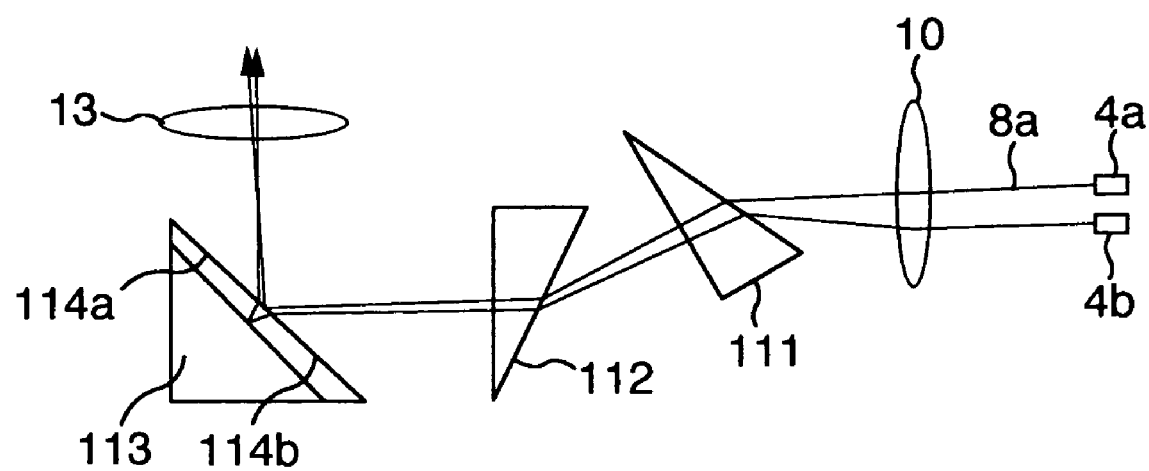
FIG. 11 depicts a configuration of major part of an optical head in accordance with a fourth embodiment of the invention.

A fourth embodiment of this invention will be explained with reference to FIG. 11. Numerals 111 and 112 denote beam reshape prisms that function to enlarge the beam width in directions on the paper of the drawing sheet, as in the above-discussed beam reshape prisms 71 and 72 shown in FIG. 7. In the above-noted second embodiment of FIG. 7, as the laser beam 6b leaving the beam reshape prisms 71 and 72 is inclined at 0.29° relative to the other laser beam 6a. With the embodiment of FIG. 11, such slight residual inclination of laser beam 6b may be removed away by using a double the laser beam 6b. As in the double mirror 11 shown in FIG. 5, the double mirror prism 121 in the embodiment of FIG. 12 has its reflective plane 123a for reflection of the laser beam 6a and a reflective plane 123b for reflection of laser beam 6b and is disposed so that the reflective plane 123b is tilted relative to the reflective plane 123a, thereby making it possible to remove away even such slight residual inclination of laser beam 6b, which in turn enables reflection of two laser beams toward the same direction.

With this embodiment also, since it is possible to freely set the beam width expansion factor owing to the double mirror prism 121 at any desired values, it becomes possible to form spots of not only round shapes but also oval shapes while at the same time enabling such two beams to straightly hit the focusing lens 13 at right angles thereto.

It has been described that in accordance with the present invention, it is possible to accomplish an optical head and optical information media record/reproduction apparatus using the same, which head is adaptable for use in recording or retrieving information to or from optical information storage media by using a plurality of laser light source units and is capable of reducing any appreciable aberration by forcing an incoming laser beam from a semiconductor laser as disposed outside of an optical axis to fall onto a focusing lens substantially at right angles thereto while avoiding a need to employ additional optical components of high costs.

What is claimed is:

1. An optical head comprising:
   an optical detector;
   a plurality of laser light sources different in wavelength from each other, where said plurality of laser light sources include a plurality of semiconductor lasers disposed on a single substrate in close proximity with said optical detector, and where emerging light flux from said plurality of laser light sources are each in a same direction and substantially parallel with each other, and have anisotropic light flux distributions oriented such that a major axis of the anisotropic light flux distributions of said plurality of laser light sources are pre-positioned at a substantially common angle;
   a collimating lens to receive a plurality of laser beams as emitted from the plurality of laser light sources
   a beam reshaping prism to reflect the plurality of laser beams as emitted from the laser light sources and passed through said collimating lens, said beam reshaping prism including more than one reflection surface and refraction surface; and
   optical convergence means for focusing the plurality of laser beams reflected from the beam reshaping prism into optical spots on an optical information storage medium;
   wherein said beam reshaping prism beam reshape at least two laser beams of different wavelengths by enlarging fluxes of the at least two laser beams in a same direction as one another,
   wherein said beam reshaping prism includes a plurality of reflection planes for reflection of laser beams of different wavelengths.

2. The optical head according to claim 1, wherein said beam reshaping prism is a riseup mirror for use in introducing a laser beam into said optical convergence means.

3. The optical head according to claim 1, wherein a laser emerging direction of said emerging light flux from said plurality of laser light sources is substantially parallel with a detecting surface of said optical detector.

4. The optical head according to claim 1, wherein said optical detector includes at least one focusing error detector and at least one optical information reproduction detector integrated onto a same substrate as a unit together with said plurality of laser light sources, wherein a laser emerging direction of said emerging light flux from said plurality of laser light sources is substantially parallel with detecting surfaces of said at least one focusing error detector and said at least one optical information reproduction detector.

5. The optical head according to claim 4, wherein said plurality of laser light sources are provided between said at least one focusing error detector and said at least one optical information reproduction detector on the same substrate.

6. An optical head comprising:
   an optical detector;
   a plurality of semiconductor laser sources different in wavelength, where said plurality of laser light sources include a plurality of semiconductor lasers disposed on a single substrate in close proximity with said optical detector, and where emerging light flux from said plurality of laser light sources are each in a same direction and substantially parallel with each other, and have anisotropic light flux distributions oriented such that a major axis of the anisotropic light flux distributions of said plurality of laser light sources are re-positioned at a substantially common angle;
   a collimating lens to convert a plurality of laser beams radiated from the semiconductor laser chips to parallel rays of light;
   a mirror in the form of a riseup mirror, to reflect the plurality of laser beams;
   optical convergence means for focusing the plurality of laser beams as reflected from said mirror into optical spots on an optical information storage medium; and
   beam reshaping prisms including a plurality of nonparallel surfaces to reshape at least two laser beams of at least two different wavelengths by enlarging fluxes of the at least two laser beams in a same direction as one another, wherein said beam reshaping prisms are disposed between said collimating lens and said optical convergence means, said beam reshaping prisms including more than one refraction surface.

7. The optical head according to claim 6, wherein said mirror is a double mirror including a plurality of nonparallel reflecting surfaces, and said double mirror is disposed as said riseup mirror to reflect said laser beams into said optical convergence means.

8. The optical head according to claim 6, wherein a laser emerging direction of said emerging light flux from said plurality of laser light sources is substantially parallel with a detecting surface of said optical detector.

9. The optical head according to claim 6, wherein said optical detector includes at least one focusing error detector and at least one optical information reproduction detector integrated onto a same substrate as a unit together with said plurality of laser light sources, wherein a laser emerging direction of said emerging light flux from said plurality of laser light sources is substantially parallel with detecting surfaces of said at least one focusing error detector and said at least one optical information reproduction detector.

10. The optical head according to claim 9, wherein said plurality of laser light sources are provided between said at least one focusing error detector and said at least one optical information reproduction detector on the same substrate.

11. An optical information media recording/reproduction apparatus to record information on an optical storage medium or to reproduce information recorded thereon, said apparatus comprising:
   an optical head to record information on the optical storage medium by irradiating laser light thereto or to reproduce information recorded on said optical storage medium by receiving light as reflected from said optical storage medium; and
   an access mechanism to control a position for illumination of laser light from said optical head onto said optical storage medium,
   wherein said optical head includes:
      an optical detector:
      a plurality of laser light sources different in wavelength from each other, where said plurality of laser light sources include a plurality of semiconductor lasers disposed on a single substrate in close proximity with said optical detector, and where emerging light flux from said plurality of laser light sources are each in a same direction and substantially parallel with each other, and have anisotropic light flux distributions oriented such that a major axis of the anisotropic light flux distributions of said plurality of laser light sources are propositioned at a substantially common angle;
      a collimating lens to receive a plurality of laser beams as emitted from the plurality of laser light sources;
      a beam reshaping prism to reflect the plurality of laser beams as emitted from the laser light sources and passed through said collimating lens, said beam reshaping prism including more than one reflection surface and refraction surface; and
      optical convergence means for focusing the plurality of laser beams reflected from the beam reshaping prism into optical spots on an optical information storage medium,
   wherein said beam reshaping prism beam reshape at least two laser beams of different wavelengths by enlarging fluxes of the at least two laser beams in a same direction as one another, and
   wherein said beam reshaping prism includes a plurality of reflection planes for reflection of laser beams of different wavelengths; and
   wherein the optical information media recording/reproduction apparatus is operable to generate a focus error detection signal and a track deviation detection signal while letting said optical detector receive reflection light of laser light falling onto said optical storage medium, and then cause said access mechanism to control a position for illumination of laser light of said optical head onto the optical storage medium to thereby perform one of recording information on the optical storage medium and playing back information as recorded thereon.

12. The optical information media recording/reproduction apparatus according to claim 11, wherein said beam reshaping prism is disposed as a riseup mirror for use in introducing a laser beam into said optical convergence means.

13. The optical information media recording/reproduction apparatus according to claim 11, wherein a laser emerging direction of said emerging light flux from said plurality of laser light sources is substantially parallel with a detecting surface of said optical detector.

14. The optical information media recording/reproduction apparatus according to claim 11, wherein said optical detector includes at least one focusing error detector and at least one optical information reproduction detector integrated onto a same substrate as a unit together with said plurality of laser light sources, wherein a laser emerging direction of said emerging light flux from said plurality of laser light sources is substantially parallel with detecting surfaces of said at least one focusing error detector and said at least one optical information reproduction detector.

15. The optical information media recording/reproduction apparatus according to claim 14, wherein said plurality of laser light sources are provided between said at least one focusing error detector and said at least one optical information reproduction detector on the same substrate.

16. An optical information media recording/reproduction apparatus to record information on an optical storage medium or to reproduce information recorded thereon, said apparatus comprising:
  an optical head to record information on the optical storage medium by irradiating laser light thereto or to reproduce information recorded on said optical storage medium by receiving light as reflected from said optical storage medium; and
  an access mechanism to control a position for illumination of laser light from said optical head onto said optical storage medium,
  wherein said optical head includes:
    an optical detector;
    a plurality of laser sources different in wavelength from each other, where said plurality of laser light sources include a plurality of semiconductor lasers disposed on a single substrate in dose proximity with said optical detector, and where emerging light flux from said plurality of laser light sources are each in a same direction and substantially parallel with each other, and have anisotropic light flux distributions oriented such that a major axis of the anisotropic light flux distributions of said plurality of laser light sources are pre-positioned at a substantially common angle;
    a collimating lens to receive a plurality of laser beams as emitted from the plurality of laser light sources;
    a beam reshaping prism to reflect the plurality of laser beams as emitted from the laser light sources and passed through said collimating lens, said beam reshaping prism including more than one reflection surface and refraction surface, and
    optical convergence means for focusing the plurality of laser beams, reflected from the beam reshaping prism into optical spots on an optical information storage medium,
  wherein said beam reshaping prism beam reshape at least two laser beams of different wavelengths by enlarging fluxes of the at least two laser beams in a same direction as one another, and said beam reshaping prism being disposed between said collimating lens and said optical convergence means, and
  wherein said beam reshaping prism includes a plurality of reflection planes for reflection of laser beams of different wavelengths; and
  wherein the optical information media recording/reproduction apparatus is operable to generate a focus error detection signal and a track deviation detection signal while letting said optical detector receive reflection light of laser light falling onto said optical information storage medium, and then cause said access mechanism to control a position for illumination of laser light of said optical head onto the optical storage medium to thereby perform one of recording information on the optical storage medium and playing back information as recorded thereon.

17. The optical information media recording/reproduction apparatus according to claim 16, wherein said beam reshaping prism is disposed as a riseup mirror for introduction of a laser beam to said optical convergence means.

18. The optical information media recording/reproduction apparatus according to claim 16, wherein a laser emerging direction of said emerging light flux from said plurality of laser light sources is substantially parallel with a detecting surface of said optical detector.

19. The optical information media recording/reproduction apparatus according to claim 16, wherein said optical detector includes at least one focusing error detector and at least one optical information reproduction detector integrated onto a same substrate as a unit together with said plurality of laser light sources, wherein a laser emerging direction of said emerging light flux from said plurality of laser light sources is substantially parallel with detecting surfaces of said at least one focusing error detector and said at least one optical information reproduction detector.

20. The optical information media recording/reproduction apparatus according to claim 19, wherein said plurality of laser light sources are provided between said at least one focusing error detector and said at least one optical information reproduction detector on the same substrate.

21. An optical information media recording/reproduction apparatus to record information on an optical storage medium or to reproduce information recorded thereon, said apparatus comprising:
  an optical head to record information on the optical storage medium by irradiating laser light thereto or to reproduce information recorded on said optical storage medium by receiving light as reflected from said optical storage medium; and
  an access mechanism to control a position for illumination of laser light from said optical head onto said optical storage medium,
  wherein said optical head includes:
    an optical detector;
    a plurality of semiconductor laser chips different in wavelength, where said plurality of laser light sources include a plurality of semiconductor lasers disposed on a single substrate in close proximity with said optical detector, and where emerging light flux from said plurality of laser light sources are each in a same direction and substantially parallel with each other, and have anisotropic light flux distributions oriented such that a major axis of the anisotropic light flux distributions of said plurality of laser light sources are pre-positioned at a substantially common angle;
    a collimating lens to convert a plurality of laser beams radiated from the semiconductor laser chips to parallel rays of light,
    a beam reshaping prism to reflect the plurality of laser beams as emitted from the laser light sources and passed through said collimating lens, said beam reshaping prism including more than one refraction surface;
    a mirror to reflect the plurality of laser beams; and
    optical convergence means for focusing the plurality of laser beams as reflected from said mirror into optical spots on an optical information storage medium;
  wherein said beam reshaping prism to thereby beam reshape at least two laser beams of different wavelengths by enlarging fluxes of the at least two laser beams in a same direction as one another, and is disposed between said collimating lens and said optical convergence means; and wherein the optical information media recording/reproduction apparatus is operable to generate a focus error detection signal and a track deviation detection signal while letting an optical detector receive reflection light of laser light falling onto said optical storage medium, and then cause said access mechanism to control a position for illumination of laser light of said optical head onto the optical storage medium to thereby perform one of recording information on the optical storage medium and playing back information as recorded thereon.

22. The optical information media recording/reproduction apparatus according to claim 21, wherein said beam reshaping prism is disposed as a riseup mirror for introduction of a laser beam to said optical convergence means.

23. The optical information media recording/reproduction apparatus according to claim 21, wherein a laser emerging direction of said emerging light flux from said plurality of laser light sources is substantially parallel with a detecting surface of said optical detector.

24. The optical information media recording/reproduction apparatus according to claim 21, wherein said optical detector includes at least one focusing error detector and at least one optical information reproduction detector integrated onto a same substrate as a unit together with said plurality of laser light sources, wherein a laser emerging direction of said emerging light flux from said plurality of laser light sources is substantially parallel with detecting surfaces of said at least one focusing error detector and said at least one optical information reproduction detector.

25. The optical information media recording/reproduction apparatus according to claim 24, wherein said plurality of laser light sources are provided between said at least one focusing error detector and said at least one optical information reproduction detector on the same substrate.

26. An optical head comprising:
an optical detector;
a plurality of laser light sources different in wavelength from each other, where said plurality of laser light sources include a plurality of semiconductor lasers disposed on a single substrate in close proximity with said optical detector, and where emerging light flux from said plurality of laser light sources are each in a same direction and substantially parallel with each other, and have anisotropic light flux distributions oriented such that a major axis of the anisotropic light flux distributions of said plurality of laser light sources are ore-positioned at a substantially common angle;
a collimating lens to receive a plurality of laser beams as emitted from the plurality of laser light sources;
a beam reshaping prism to reflect a plurality of laser beams as emitted from the laser light sources and passed through said collimating lens, said beam reshaping prism including more than one reflection surface and refraction surface; and
optical convergence means to focus the plurality of laser beams reflected from the beam reshaping prism into optical spots on an optical information storage medium;
wherein said beam reshaping prism beam reshapes at least two laser beams of different wavelengths by enlarging fluxes of the at least two laser beams in a same direction as one another, and said beam reshaping prism being disposed between a collimating lens and said optical convergence means, and
wherein said beam reshaping prism includes a plurality of reflection planes for reflection of laser beams of different wavelengths.

27. The optical head according to claim 26, wherein said beam reshaping prism has a reflection plane and is disposed as a riseup mirror for introduction of a laser beam to said optical convergence means.

28. The optical head according to claim 26, wherein a laser emerging direction of said emerging light flux from said plurality of laser light sources is substantially parallel with a detecting surface of said optical detector.

29. The optical head according to claim 26, wherein said optical detector includes at least one focusing error detector and at least one optical information reproduction detector integrated onto a same substrate as a unit together with said plurality of laser light sources, wherein a laser emerging direction of said emerging light flux from said plurality of laser light sources is substantially parallel with detecting surfaces of said at least one focusing error detector and said at least one optical information reproduction detector.

30. The optical head according to claim 29, wherein said plurality of laser light sources are provided between said at least one focusing error detector and said at least one optical information reproduction detector on the same substrate.

31. An optical head comprising:
an optical detector;
a plurality of laser light sources different in wavelength, where said plurality of laser light sources include a plurality of semiconductor lasers disposed on a single substrate in close proximity with said optical detector, and where a light emerging direction of emerging light flux from said plurality of laser light sources are each in a same direction and substantially parallel with each other, and is substantially parallel with a detecting surface of said optical detector, and said plurality of laser light sources have anisotropic light flux distributions oriented such that a major axis of the anisotropic light flux distributions of said plurality of laser light sources are pre-positioned at a substantially common angle;
a collimating lens to receive a plurality of laser beams as emitted from the plurality of laser light sources;
a beam shaping optics to enlarge at least one laser beam in one direction, and to shape a light density distribution of the light flux into a substantially circular shape;
a mirror in the form of a rise-up mirror, to reflect the plurality of laser beams; and
converging optics to focus the plurality of laser beams as reflected from said mirror into optical spots on an optical information storage medium; and
wherein the beam shaping optics to enlarge a plurality of light fluxes of different wavelengths in a same direction, and includes a surface to refract the plurality of light fluxes together, and wherein the beam shaping optics is structured by more than one prism, and is disposed between the collimating lens and the converging optics.

32. The optical head according to claim 31, wherein the rise-up mirror has a plurality of reflecting surfaces which are non-parallel with each other, and wherein at least one light flux of the plurality of light fluxes is reflected at a surface of the rise-up mirror, and at least one light flux of the plurality of light fluxes is refracted at a surface of the rise-up mirror, and wherein the rise-up mirror is disposed between the beam shaping optics and the converging optics.

33. An optical head comprising:
an optical detector;
a plurality of laser light sources different in wavelength, where said plurality of laser light sources include a plurality of semiconductor lasers disposed on a single substrate in close proximity with said optical detector, and where a light emerging direction of emerging light flux from said plurality of laser light sources are each in a same direction and substantially parallel with each other, and is substantially parallel with a detecting surface of said optical detector, and said plurality of laser light sources have anisotropic light flux distributions oriented such that a major axis of the anisotropic light flux distributions of said plurality of laser light sources are pre-positioned at a substantially common angle;
a collimating lens to receive a plurality of laser beams as emitted from the plurality of laser light sources;
a beam shaping optics to enlarge at least one laser beam in one direction, and to shape a light density distribution of the light flux into a substantially circular shape;
converging optics to focus the plurality of laser beams into optical spots on an optical information storage medium;
wherein the beam shaping optics to enlarge a plurality of light fluxes of different wavelengths in a same direction, and includes a refraction surface to refract the plurality of light fluxes of different wavelengths together, and includes a reflection surface to reflect the plurality of light fluxes of different wavelengths together, where the refraction surface and the reflection surface are non-parallel, and wherein the beam shaping optics acts as a rise-up mirror and is structured by more than one prism, and is disposed between the collimating lens and the converging optics.

34. An optical head comprising:
an optical detector,
a plurality of laser light sources different in wavelength, where said plurality of laser light sources include a plurality of semiconductor lasers disposed on a single substrate in close proximity with said optical detector, and where a light emerging direction of emerging light flux from said plurality of laser light sources are each in a same direction and substantially parallel with each other, and is substantially parallel with a detecting surface of said optical detector, and said plurality of laser light sources have anisotropic light flux distributions oriented such that a major axis of the anisotropic light flux distributions of said plurality of laser light sources are pre-positioned at a substantially common angle;
a collimating lens to receive a plurality of laser beams as emitted from the plurality of laser light sources;
a beam shaping optics to enlarge at least one laser beam in one direction, and to shape a light density distribution of the light flux into a substantially circular shape;
converging optics to focus the plurality of laser beams into optical spots on an optical information storage medium;
wherein the beam shaping optics to enlarge a plurality of light fluxes of different wavelengths in a same direction, and includes a refraction surface to refract the plurality of light fluxes of different wavelengths together, and includes a plurality of reflection surfaces to reflect ones of the plurality of light fluxes, with at least one light flux being reflected and at least one remaining light flux being passed therethrough, where the plurality of reflection surfaces are non-parallel, and wherein the beam shaping optics acts as a rise-up mirror and is structured by more than one prism, and is disposed between the collimating lens and the converging optics.

35. An optical information media recording/reproduction apparatus to record information on an optical storage medium or to reproduce information recorded thereon, said apparatus comprising:
an optical head to record information on the optical storage medium by irradiating laser light thereto or to reproduce information recorded on said optical storage medium by receiving light as reflected from said optical storage medium; and
an access mechanism to control a position for illumination of laser light from said optical head onto said optical storage medium,
wherein said optical head includes:
an optical detector;
a plurality of laser light sources different in wavelength, where said plurality of laser light sources include a plurality of semiconductor lasers disposed on a single substrate in close proximity with said optical detector, and where a light emerging direction of emerging light flux from said plurality of laser light sources are each in a same direction and substantially parallel with each other, and is substantially parallel with a detecting surface of said optical detector, and said plurality of laser light sources have anisotropic light flux distributions oriented such that a major axis of the anisotropic light flux distributions of said plurality of laser light sources are pre-positioned at a substantially common angle;
a collimating lens to receive a plurality of laser beams as emitted from the plurality of laser light sources;
a beam shaping optics to enlarge at least one laser beam in one direction, and to shape a light density distribution of the light flux into a substantially circular shape;
a mirror in the form of a riseup mirror, to reflect the plurality of laser beams; and
converging optics to focus the plurality of laser beams as reflected from said mirror into optical spots on an optical information storage medium; and
wherein the beam shaping optics to enlarge a plurality of light fluxes of different wavelengths in a same direction, and includes a surface to refract the plurality of light fluxes together, and wherein the beam shaping optics is structured by more than one prism, and is disposed between the collimating lens and the converging optics.

36. The optical information media recording/reproduction apparatus according to claim 35, wherein the rise-up mirror has a plurality of reflecting surfaces which are non-parallel with each other, and wherein at least one light flux of the plurality of light fluxes is reflected at a surface of the rise-up mirror, and at least one light flux of the plurality of light fluxes is refracted at a surface of the rise-up mirror, and wherein the rise-up mirror is disposed between the beam shaping optics and the converging optics.

37. An optical information media recording/reproduction apparatus to record information on an optical storage medium or to reproduce information recorded thereon, said apparatus comprising:

an optical head to record information on the optical storage medium by irradiating laser light thereto or to reproduce information recorded on said optical storage medium by receiving light as reflected from said optical storage medium; and an access mechanism to control a position for illumination of laser light from said optical head onto said optical storage medium, wherein said optical head includes:

an optical detector;

a plurality of laser light sources different in wavelength, where said plurality of laser light sources include a plurality of semiconductor lasers disposed on a single substrate in close proximity with said optical detector, and where a light emerging direction of emerging light flux from said plurality of laser light sources are each in a same direction and substantially parallel with each other, and is substantially parallel with a detecting surface of said optical detector, and said plurality of laser light sources have anisotropic light flux distributions oriented such that a major axis of the anisotropic light flux distributions of said plurality of laser light sources are pre-positioned at a substantially common angle;

a collimating lens to receive a plurality of laser beams as emitted from the plurality of laser light sources;

a beam shaping optics to enlarge at least one laser beam in one direction, and to shape a light density distribution of the light flux into a substantially circular shape; and converging optics to focus the plurality of laser beams into optical spots on an optical information storage medium;

wherein the beam shaping optics to enlarge a plurality of light fluxes of different wavelengths in a same direction, and includes a refraction surface to refract the plurality of light fluxes of different wavelengths together, and includes a reflection surface to reflect the plurality of light fluxes of different wavelengths together, where the refraction surface and the reflection surface are non-parallel, and wherein the beam shaping optics acts as a rise-up mirror and is structured by more than one prism, and is disposed between the collimating lens and the converging optics.

38. An optical information media recording/reproduction apparatus to record information on an optical storage medium or to reproduce information recorded thereon, said apparatus comprising:

an optical head to record information on the optical storage medium by irradiating laser light thereto or to reproduce information recorded on said optical storage medium by receiving light as reflected from said optical storage medium; and an access mechanism to control a position for illumination of laser light from said optical head onto said optical storage medium, wherein said optical head includes:

an optical detector;

a plurality of laser light sources different in wavelength, where said plurality of laser light sources include a plurality of semiconductor lasers disposed on a single substrate in close proximity with said optical detector, and where a light emerging direction of emerging light flux from said plurality of laser light sources are each in a same direction and substantially parallel with each other, and is substantially parallel with a detecting surface of said optical detector, and said plurality of laser light sources have anisotropic light flux distributions oriented such that a major axis of the anisotropic light flux distributions of said plurality of laser light sources are pre-positioned at a substantially common angle;

a collimating lens to receive a plurality of laser beams as emitted from the plurality of laser light sources;

a beam shaping optics to enlarge at least one laser beam in one direction, and to shape a light density distribution of the light flux into a substantially circular shape; and converging optics to focus the plurality of laser beams into optical spots on an optical information storage medium;

wherein the beam shaping optics to enlarge a plurality of light fluxes of different wavelengths in a same direction, and includes a refraction surface to refract the plurality of light fluxes of different wavelengths together, and includes a plurality of reflection surfaces to reflect ones of the plurality of light fluxes, with at least one light flux being reflected and at least one remaining light flux being passed therethrough, where the plurality of refraction surfaces are non-parallel, and wherein the beam shaping optics acts as a rise-up mirror and is structured by more than one prism, and is disposed between the collimating lens and the converging optics.

* * * * *